United States Patent
Iglehart et al.

[19]

[11] Patent Number: 6,091,812
[45] Date of Patent: Jul. 18, 2000

[54] APPARATUS AND METHOD FOR AUTOMATICALLY SWITCHING A HEADSET BETWEEN A TELEPHONE AND A SECOND AUDIO SOURCE

[75] Inventors: David Iglehart; Leland Lester, both of Austin; Elie Antoun Jreij, Pflugerville; Luc Truong, Houston; William E. Levene, Austin, all of Tex.

[73] Assignee: Siemens Information and Communication Networks, Inc., Boca Raton, Fla.

[21] Appl. No.: 08/747,468

[22] Filed: Nov. 12, 1996

[51] Int. Cl.[7] ............................. H04M 3/51; H04M 1/08
[52] U.S. Cl. ............... 379/308; 379/90.01; 379/110.01; 379/267; 379/424
[58] Field of Search ..................... 379/90, 110, 214, 379/218, 265, 267, 309, 388, 390, 420, 373, 90.01, 110.01, 308, 102.03, 430, 387, 422, 423, 424

[56] References Cited

U.S. PATENT DOCUMENTS

| | | | |
|---|---|---|---|
| 4,517,413 | 5/1985 | Pavitt, Jr. | 379/110.01 |
| 4,560,838 | 12/1985 | Meisenheimer | 379/101.01 |
| 4,653,087 | 3/1987 | Galich | 379/373 X |
| 4,790,002 | 12/1988 | D'Agosto, III et al. | 379/387 X |
| 5,128,987 | 7/1992 | McDonough et al. | 379/102.03 |
| 5,694,467 | 12/1997 | Young, III | 379/430 |

FOREIGN PATENT DOCUMENTS

| | | |
|---|---|---|
| 0387516A2 | 9/1990 | European Pat. Off. . |
| 0531094A2 | 3/1993 | European Pat. Off. . |
| 7-307773 | 11/1995 | Japan . |
| 0597893 | 2/1948 | United Kingdom . |
| 2308775A | 7/1997 | United Kingdom . |

*Primary Examiner*—Harry S. Hong

[57] ABSTRACT

An apparatus and method are disclosed for connecting a headset alternately to a telephone line and an audio device. The apparatus includes an audio connector for connecting the apparatus to the audio device, a telephone connector for connecting the apparatus to the telephone line, and a headset connector for connecting the apparatus to the headset. The apparatus also includes a switching circuit connected to the audio, telephone and headset connectors. The switching circuit connects the telephone connector to the headset connector in response to sensing a voltage greater than a predetermined threshold on the telephone line. When the voltage sensed returns to a value less than the predetermined threshold value, the switching circuit reconnects the headset connector to the audio connector.

16 Claims, 3 Drawing Sheets

FIG_1

FIG_2

APPARATUS AND METHOD FOR AUTOMATICALLY SWITCHING A HEADSET BETWEEN A TELEPHONE AND A SECOND AUDIO SOURCE

FIELD OF THE INVENTION

The present invention relates to telephone handsets and the like, and more particularly, to an apparatus for switching a headset between a telephone and a second audio source.

BACKGROUND OF THE INVENTION

Headsets provide a number of advantages for both telephone communication and audio playback. Consider a worker who works in an environment in which he and his co-workers work in open cubicles instead of closed offices. The worker finds it advantageous to use a headset when making telephone calls, since the headset reduces the interference from the background noise in the work place, and also frees the worker's hands to type on a workstation during the call. The worker may also wish to listen to music as she works when she is not on the telephone. Since she works in an open cubicle environment, she must also use a headset to listen to her tape recorder or other audio source.

Each time a telephone call is received, the worker must switch between headsets. This requires two headsets and the accompanying cords. The process of exchanging headsets can lead to tangled cords. In addition, the currently unused headset gets in the way when it is placed on the worker's desk.

Broadly, it is the object of the present invention to provide an improved telephone headset arrangement.

It is a further object of the present invention to provide an apparatus that allows the user to conveniently switch between a telephone call and a second audio source without removing the user's headset.

These and other objects of the present invention will become apparent to those skilled in the art from the following detailed description of the invention and the accompanying drawings.

SUMMARY OF THE INVENTION

The present invention is an apparatus for connecting a headset alternately to a telephone line or an audio device. The apparatus includes an audio connector for connecting the apparatus to the audio device, a telephone connector for connecting the apparatus to the telephone line, and a headset connector for connecting the apparatus to the headset. The apparatus also includes a switching circuit connected to the audio, telephone and headset connectors. The switching circuit connects the telephone connector to the headset connector in response to sensing a voltage greater than a predetermined threshold on the telephone line. When the voltage sensed returns to a value less than the predetermined threshold value, the switching circuit reconnects the headset connector to the audio connector.

DETAILED DESCRIPTION OF THE INVENTION

The present invention is an apparatus that connects a headset to either a telephone line or a second audio source such as a CD player, tape recorder, or computer running a multimedia presentation. The user wears a single headset for both the telephone and audio source. The user switches from the audio source to the telephone by causing the telephone to go off hook. The present invention senses the current on the telephone input and switches the headset to the telephone connection from the audio source connection. When the telephone goes back on hook, the apparatus of the present invention, reconnects the headset to the audio source.

Figure 1:
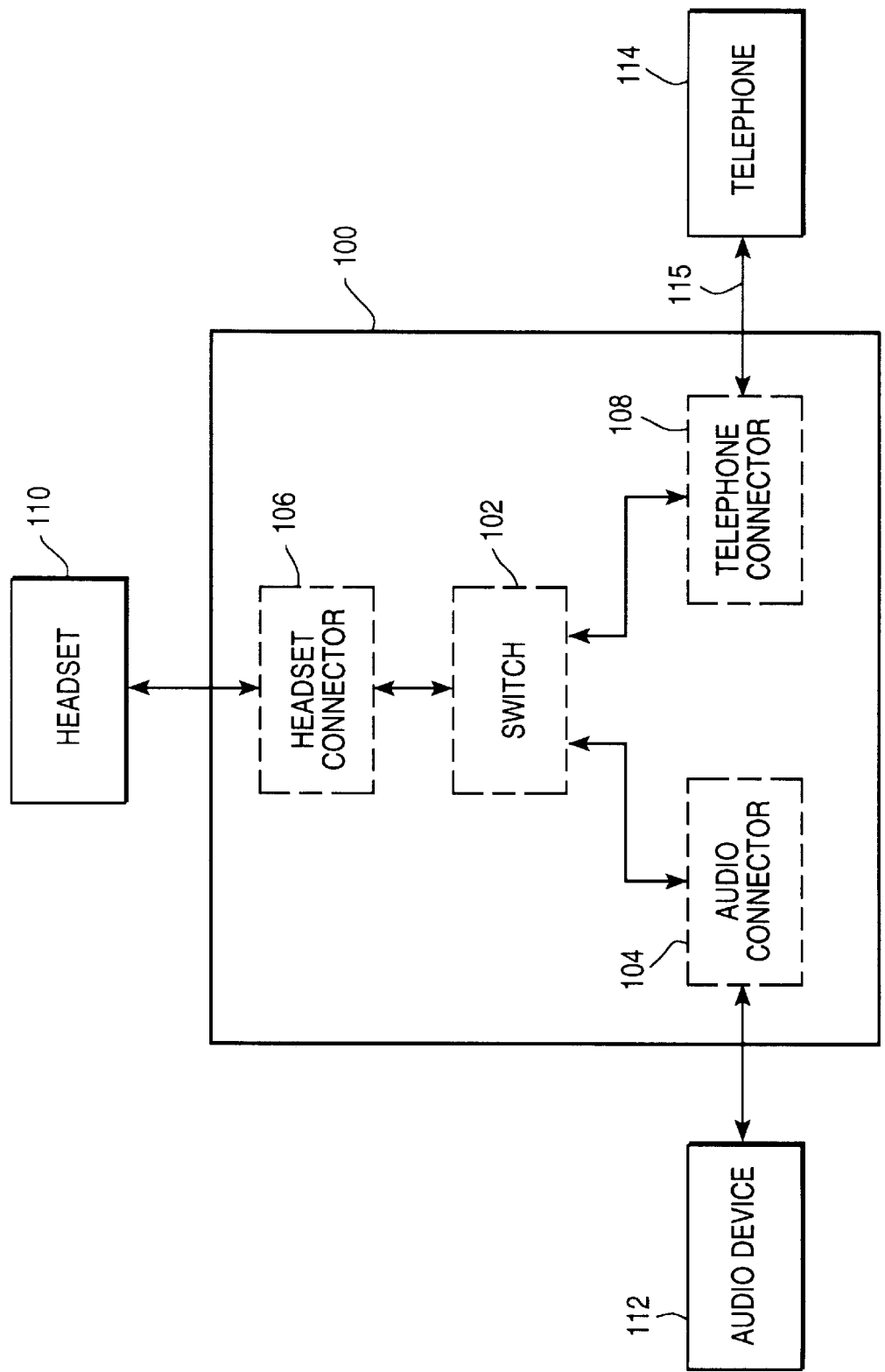
FIG. 1 is a block diagram of a headset switching apparatus according to the present invention.

FIG. 1 is a block diagram of a headset 110 connected to a switching apparatus 100 via connector 106, in accordance with the present invention. Switching apparatus 100 includes a connector 104 for an audio source 112 and a connector 108 that connects to a telephone line 115 which is also connected to telephone 114. Connector 106 is switched from connector 104 to connector 108 when voltage sensing switch 102 detects a voltage greater than a predetermined threshold voltage across the telephone connector 108. This voltage difference is generated when telephone 114 goes off hook. When telephone 114 goes back on hook, voltage sensing switch 102 detects the change in voltage on connector 108 and reconnects connector 106 to connector 104.

Figure 2:
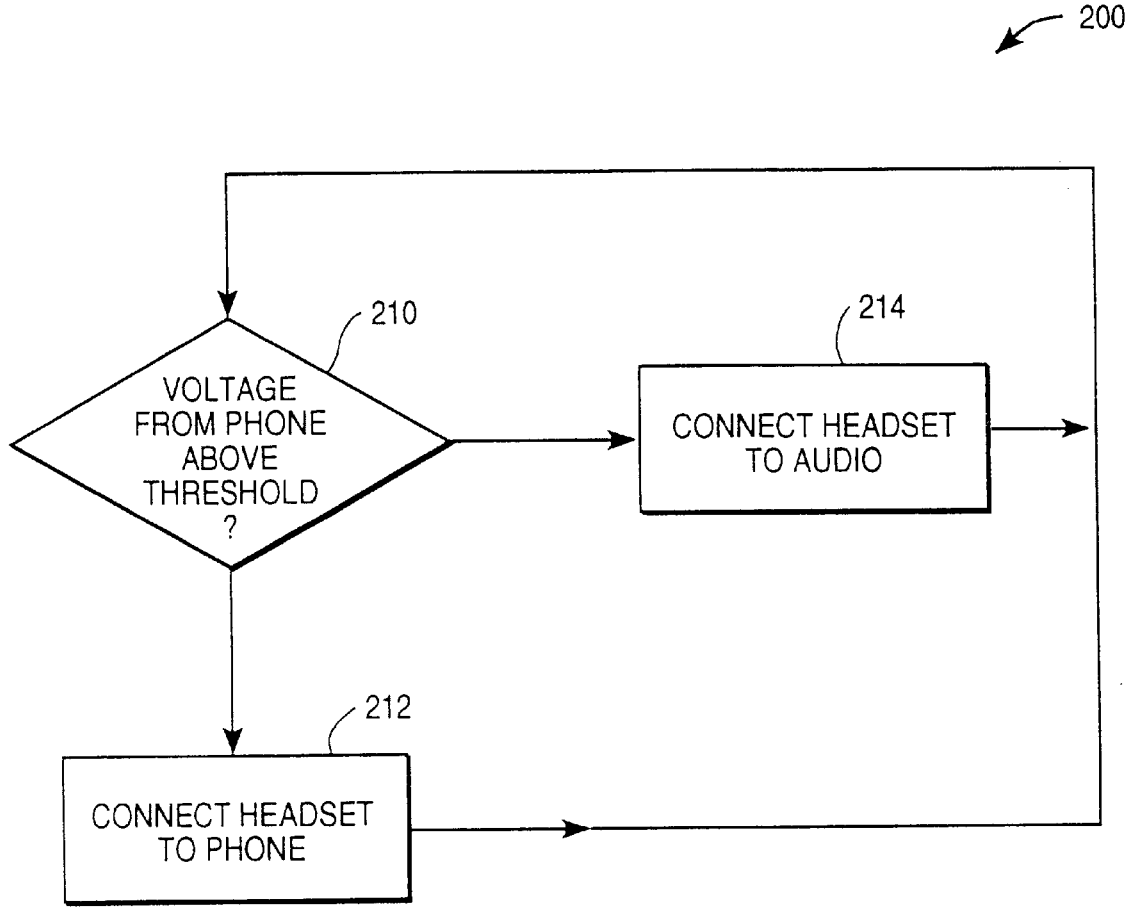
FIG. 2 is a flow chart of the steps of the present invention.

FIG. 2 shows steps of a method 200 in accordance with the present invention. The method begins with a step 210. At step 210, voltage from telephone 114 is monitored. If the voltage from telephone 116 is greater than a predetermined threshold, headset 110 is connected to the telephone, at a step 212. The method then proceeds to step 210, and continue to monitor the voltage. When the voltage drops below the threshold, headset 110 is connected to audio device 112, at a step 214. The method then proceeds to step 210, and continues to monitor the voltage.

If, at step 210, the voltage detected is less than the threshold headset 110 is connected to alternative audio device 112 at step 214. The method proceeds to step 210, and the voltage is monitored. If detected voltage exceeds the threshold, headset 110 is connected to telephone 114 at step 212.

While the present invention has been described in terms of a separate telephone, it will be apparent to those skilled in the art that an off-hook switching circuit can be provided in the present invention which performs the operation of taking the telephone off-hook in response to depressing a button or throwing a switch. Similarly, the present invention may be included in computer systems as part of a telephony board or the like.

Figure 3:
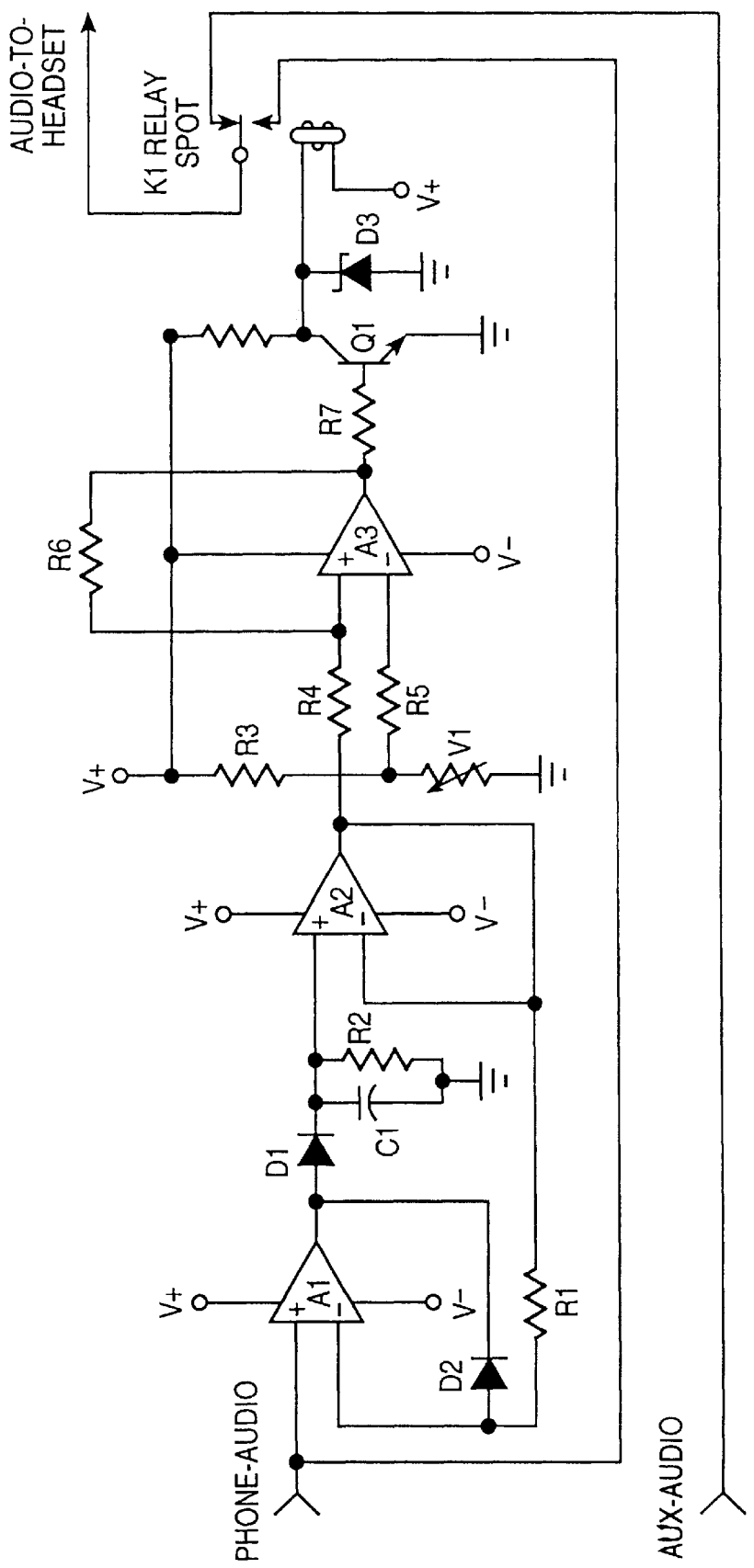
FIG. 3 is a diagram of a circuit used to implement the present invention.

An implementation of the invention is shown in FIG. 3. The device shown in FIG. 3 comprises three diodes, three op-amps, 8 resistors, a capacitor, a varistor, a relay, and a transistor.

Diode D1 and op-amp A1 combine to form a super diode in a peak rectifier circuit. The super diode combines with capacitor C1 and resistor R2 to serve as a precision peak-hold rectifier. If input (phone audio) is greater than the output of the op-amp A1, diode D1 will be ON and will close the negative feedback loop through a buffer op-amp A2 and resistor R1. The output voltage of op-amp A1 then will follow the input and supply the current to charge the holding capacitor C1. Beyond the positive peak of the input voltage, op-amp A1 will see a negative input. This causes the output to be negative and turns off diode D1.

Op-amp A2 serves as a buffer with high input impedance and low bias current. This allows the discharge-time/holding-time to be controlled precisely by resistor R2. Note that additional diode D2 is in the circuit to act as a caching diode to prevent negative saturation and delay of op-amp A1.

Third op-amp A3 with its associated components serves as a simple positive feedback comparator with hysteresis. The inverting input voltage is set at a desired threshold value. Note that varistor V1 allows the user to vary switch level according to his or her unique equipment. The rest of the circuit at the output of op-amp A3 is used to drive relay K1.

The invention is applicable to other embodiments than a headset and telephone. For example, a speaker in a speaker phone could be used alternately to listen to an audio program and as a telephone. In a car, a cordless telephone and audio device could alternately use the same speaker. Various other modifications to the present invention will become apparent to those skilled in the art from the foregoing description and accompanying drawings. Accordingly, the present invention is to be limited solely by the scope of the following claims.

What is claimed is:

1. An apparatus for connecting a speaker alternately to a telephone line and an audio device, said apparatus comprising:
   an audio connector for connecting said apparatus to said audio device;
   a telephone connector for connecting said apparatus to said telephone line;
   a speaker connector for connecting said apparatus to said speaker; and
   a switching circuit connected to said audio, telephone and speaker connectors, said switching circuit connecting said telephone connector to said speaker connector in response to sensing a voltage greater than a predetermined threshold on said telephone line, and said switching circuit connecting said speaker connector to said audio connector when the voltage sensed on said telephone line is less than said predetermined threshold voltage.

2. An apparatus as in claim 1, wherein said telephone line is taken off hook in response to said telephone connector being connected to said speaker connector.

3. An apparatus as in claim 1, wherein said telephone line is on hook when said audio connector is connected to said speaker connector.

4. An apparatus as in claim 1, wherein in response to said telephone connector being connected to said speaker connector, a user answers a telephone call on said telephone line using said speaker.

5. An apparatus for connecting a headset alternately to a telephone line and an audio device, said apparatus comprising:
   an audio connector for connecting said apparatus to said audio device;
   a telephone connector for connecting said apparatus to said telephone line;
   a headset connector for connecting said apparatus to said headset; and
   a switching circuit connected to said audio, telephone and headset connectors, said switching circuit connecting said telephone connector to said headset connector in response to sensing a voltage greater than a predetermined threshold on said telephone line, and said switching circuit connecting said headset connector to said audio connector when the voltage sensed on said telephone line is less than said predetermined threshold voltage.

6. An apparatus as in claim 5, wherein said telephone line is taken off hook in response to said telephone connector being connected to said headset connector.

7. An apparatus as in claim 5, wherein said telephone line is on hook when said audio connector is connected to said headset connector.

8. An apparatus as in claim 5, wherein a user answers a telephone call on said telephone line using said headset in response to said telephone connector being connected to said headset connector.

9. A method for connecting a speaker alternately to an audio device and a telephone line to a speaker, said method comprising the steps of:
   connecting said speaker, telephone line, and audio device to a switching device;
   sensing the voltage on said telephone line; and
   switching said speaker to said telephone line whenever said voltage is greater than a predetermined threshold voltage, and to said audio device whenever said voltage is less than said predetermined voltage.

10. A method as in claim 9, wherein in said switching step, said telephone line is taken off hook in response to said telephone connector being connected to said speaker connector.

11. A method as in claim 9, wherein in said switching step, said telephone line is on hook when said audio connector is connected to said speaker connector.

12. A method as in claim 9, wherein in said switching step, a user answers a telephone call on said telephone line using said speaker in response to said telephone connector being connected to said speaker.

13. A method for connecting a headset alternately to an audio device and a telephone line, said method comprising the steps of:
   connecting said headset, telephone line, and audio device to a switching device;
   sensing the voltage on said telephone line; and
   switching said headset to said telephone line whenever said voltage is greater than a predetermined threshold voltage, and to said audio device whenever said voltage is less than said predetermined voltage.

14. A method as in claim 13, wherein in said switching step, said telephone line is taken off hook in response to said telephone connector being connected to said headset connector.

15. A method as in claim 13, wherein in said switching step, said telephone line is on hook when said audio connector is connected to said headset connector.

16. A method as in claim 13, wherein in said switching step, a user answers a telephone call on said telephone line using said speaker in response to said telephone connector being connected to said headset.

* * * * *